US008103019B1

(12) United States Patent
Pandey et al.

(10) Patent No.: US 8,103,019 B1

(45) Date of Patent: Jan. 24, 2012

(54) PROBABILISTIC GAIN-SENSING RINGING FEEDBACK DETECTOR

(75) Inventors: Ashutosh Pandey, Murray, UT (US); David Lambert, South Jordan, UT (US)

(73) Assignee: Clearone Comminications, Inc., Salt Lake City, UT (US)

( * ) Notice: Subject to any disclaimer, the term of this patent is extended or adjusted under 35 U.S.C. 154(b) by 656 days.

(21) Appl. No.: 12/247,747

(22) Filed: Oct. 8, 2008

(51) Int. Cl.
*H04B 15/00* (2006.01)

(52) U.S. Cl. ........ 381/93; 381/94.1; 381/94.2; 381/94.3

(58) Field of Classification Search .................... 381/93, 381/94.1, 94.2, 94.3
See application file for complete search history.

(56) References Cited

U.S. PATENT DOCUMENTS

2002/0071573 A1 6/2002 Finn
2007/0104335 A1* 5/2007 Shi et al. ......................... 381/93

* cited by examiner

*Primary Examiner* — Long Pham

(74) *Attorney, Agent, or Firm* — Matthew J. Booth & Associates, PLLC; Matthew J. Booth

(57) ABSTRACT

Disclosed herein are detectors of audio ringing feedback, that is decaying feedback with a gain of less than one, those detectors utilizing a repeated gain measurement that applied to a range of gain values characteristic of ringing-type feedback. Those gain measurements, while in the range, increase a probability measurement of feedback. When the probability of feedback reaches a threshold, a detection of feedback is made and feedback countermeasures, such as the application of a notch filter, may be applied. Optionally, the audio gain around likely frequencies of feedback may be enhanced for a time to increase the resolution of identification of a feedback frequency, which may be identified through an interpolative method. Repeated gain measurements may also identify building-type feedback. A ringing detector may include more than one range of detection, for example for building, strong-ringing and weak-ringing feedback.

17 Claims, 7 Drawing Sheets

FIG. 4
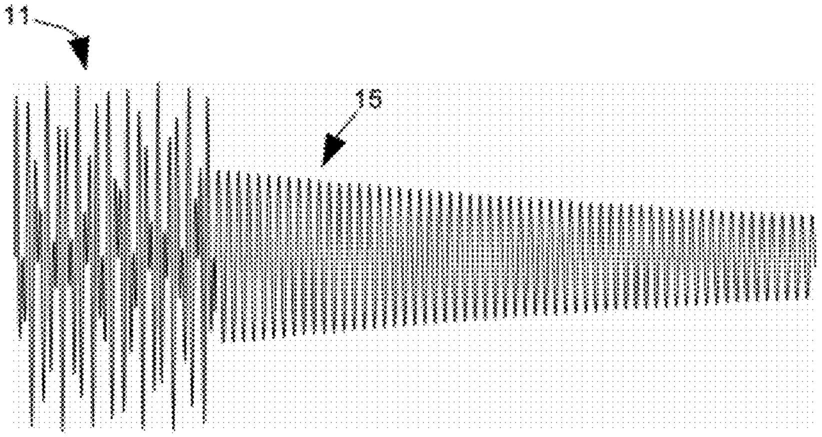
FIG. 5
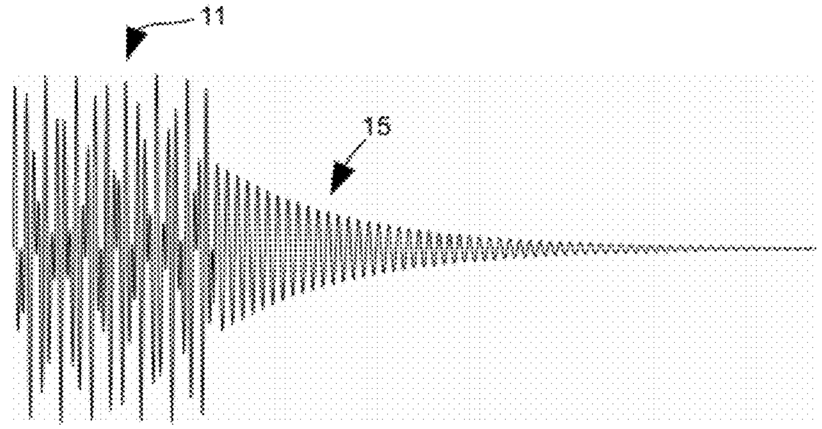
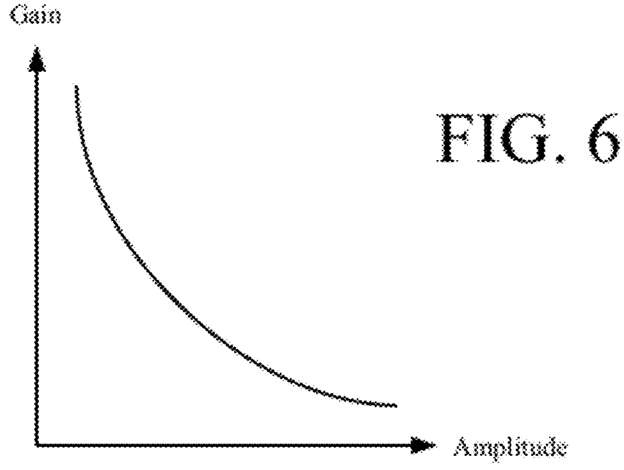
FIG. 6

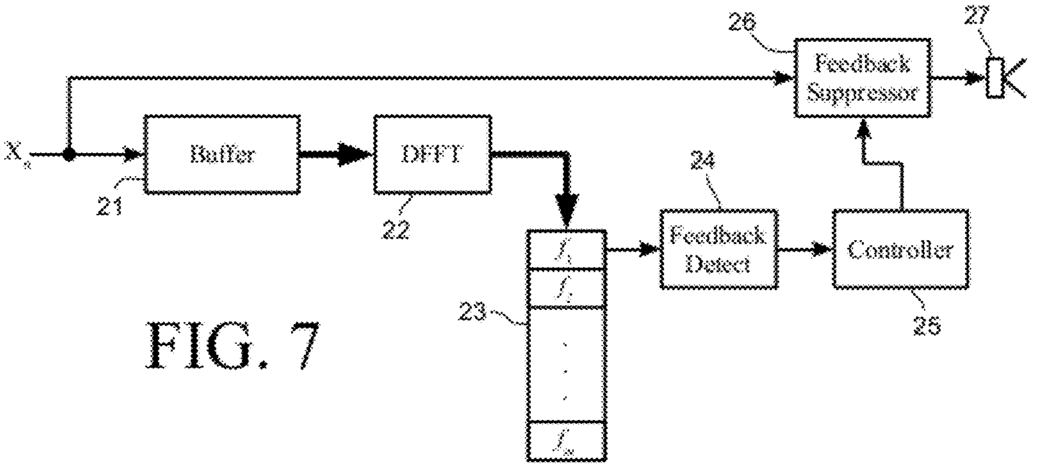
FIG. 7
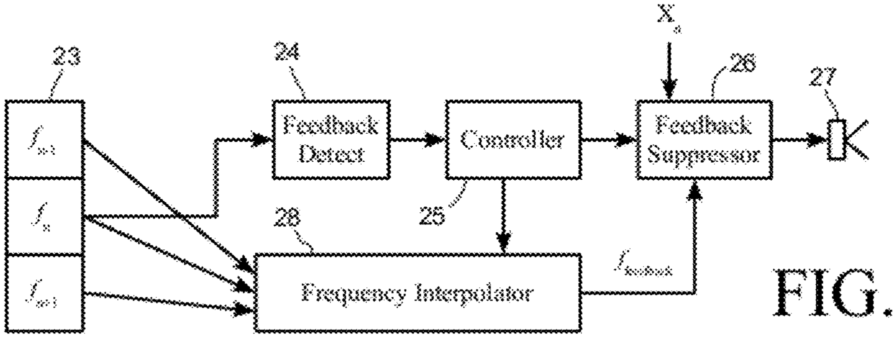
FIG. 8
FIG. 9
$$\begin{bmatrix} f_1^2 & f_1 & 1 \\ f_2^2 & f_2 & 1 \\ f_3^2 & f_3 & 1 \end{bmatrix} \begin{bmatrix} P_1 \\ P_2 \\ P_3 \end{bmatrix} = \begin{bmatrix} Y_1 \\ Y_2 \\ Y_3 \end{bmatrix} \quad \text{(a)}$$
$$\vec{F}\vec{P} = \vec{Y} \quad \text{(b)}$$
$$\vec{P} = \vec{F}^{-1}\vec{Y} \quad \text{(c)}$$
$$\text{(d)} \quad \begin{bmatrix} P_1 \\ P_2 \\ P_3 \end{bmatrix} = \begin{bmatrix} 0.5 & -1.0 & 0.5 \\ -2.5 & 4.0 & -1.5 \\ 3.0 & -3.0 & 1.0 \end{bmatrix} \begin{bmatrix} Y_1 \\ Y_2 \\ Y_3 \end{bmatrix}$$

PROBABILISTIC GAIN-SENSING RINGING FEEDBACK DETECTOR

CROSS REFERENCE TO RELATED APPLICATIONS

The following applications share a common specification: U.S. application Ser. No. 12/247,747 (date filed 8 Oct. 2008), U.S. application Ser. No. 12/247,757 (date filed 8 Oct. 2008), and U.S. application Ser. No. 12/247,768 (date filed 8 Oct. 2008).

BACKGROUND

The claimed systems and methods relate generally to audio feedback detectors and feedback interrupters, and more particularly to audio amplification systems that include a feedback loop and a detector of non-building, or ringing, feedback, those systems including public address systems and other electronic devices such as hearing aids.

Feedback in public address systems is a common problem. For background and referring to FIG. 1, a public address system includes a microphone 3 for picking up the speech of a participant 5 and a speaker 2 for broadcasting that speech into a room where others may hear. A public address system also includes electronics 1 that may include several functions, one of which is the amplification of sound received at microphone 3 and produced at speaker 2 by way of an amplifier 4. Usually, microphone 3 and speaker 2 are located in the same audible space as the person speaking 5 and his listeners, and some of the sound produced by speaker 2 is picked up by the microphone 3. For most sound, this is not a problem because the speaker-produced sound has much less volume than the speech of a participant 5 at microphone 3 and because speaker 2 is normally not pointed at microphone 3. However, there may be one or more objects 6 that reflect speaker-produced sound to the microphone 3 that may cause difficulty.

In such a circumstance, a particular frequency of sensitivity may result having a period of the feedback loop (or fraction thereof), which is generally the time for sound to pass from speaker 2 to object 6 and back to microphone 3. Such a feedback path may exist at one frequency, or there may be multiple objects, feedback paths, frequencies and harmonics in an environment. Feedback paths may also arise, diminish or change frequency as objects are moved within the room. Feedback, either howling or ringing, often requires some trigger sound to produce audible effects, although it is possible for low-volume noise to initiate feedback in some systems.

Now shown in FIG. 2 is a representation of a waveform of a typical howling event, which waveform typically represents the voltage produced at amplifier 4, the current through speaker 2 or the voltage signal produced by microphone 3. A howling event is usually initiated by an independent sound 11 passing through the system, i.e. independently of the PA system. (For reference, in the examples of FIGS. 2 through 5 independent sound 11 is shown in equal amplitude.) Feedback is more likely if independent sound 11 contains a frequency component at the frequency of sensitivity, although other sounds can also trigger a feedback event. The electronics of a public address system may also provide some suppression for sounds at low amplitude, for example electronic noise, preventing the triggering of a feedback event until a sound is present that exceeds some level. Moreover, many systems introduce a non-linearity into the system that may block feedback where sound of certain amplitudes are introduced, for example through the inclusion of a compressor or other processing element. Perhaps the most common way to reduce feedback is by control of the gain of the system (reducing it below 1), which may be accomplished for all frequencies simply by volume control or in a frequency range by the use of an equalizer.

Continuing with the example of FIG. 2, at some time 12 the independent sound 11 ceases in this example, and the remaining portion of the waveform represents the feedback of the system. In the example of FIG. 2 the gain at the frequency of sensitivity is greater than one, causing a signal at the frequency of sensitivity to build in amplitude in region 13. Without remedial measures this amplitude may build until amplifier 4 reaches saturation or until some other system amplification limit is reached.

Still referring to FIG. 2, the region 14 of saturation is referred to commonly as howling, which is characterized by a loud and possibly uncomfortable monotone produced and maintained by the system until the feedback loop is interrupted. Automatic remedial measures have been devised to detect and interrupt howling, which generally use a methodology as follows. First, the amplitude of sound produced at speaker 2 is monitored, and if the sound exceeds some threshold for a period of time howling is detected. The remedial measure may be to reduce the gain of amplifier 4, or to identify the frequency of howling and apply a filter, such as a notch filter or a filter applying a phase change to cancellation at the frequency of howling. More sophisticated systems apply a discrete Fourier transform to the signal, looking for sound around a particular frequency that exceeds a threshold for some specified period. However, all of these systems must wait for a period of howling to occur, and are not capable of proactively suppressing feedback.

For example, shown in FIG. 3 is a waveform representative of a feedback event where the gain in the feedback loop is over, but close to one. Under those conditions the feedback at the frequency of sensitivity slowly builds in volume, and in a thresholded system no remedial measures will be engaged for some period of time because the amplitude of the feedback signal is close to the amplitude of participant speech. The situation shown in FIG. 3 of a gain of just over one is referred to herein as moderate feedback as opposed to the situation of FIG. 2 of aggressive feedback that reasonably rapidly saturates or howls from the standpoint of a volume-threshold detection method.

Now turning to FIG. 4, other feedback events may not build into howling, but rather feedback may decay in a "ringing" fashion. This type of feedback can be initiated by a frequency component at or near the frequency of sensitivity in the independent speech 11. The feedback effect 15 is sometimes heard as a monotone "ringing" after each word or phrase of speech by the participant. The prior remedial measures for howling are not effective to ringing, generally because the amplitude of the ringing is less than the amplitude of participant speech and is more difficult to detect.

Ringing of the form shown in FIG. 4 in system operation is apparent, extending noticeably some time after independent speech ends. Weak-ringing such as that shown in FIG. 5 may decay more rapidly, but although might not be immediately identifiable by a person may also be a nuisance; muddying speech and fatiguing the ears of listeners. Of note, sometimes ringing can have an oscillatory behavior, that is not decreasing strictly in a logarithmic way; rather some ringing can be influenced by other noise or distorting factors, including electronic noise or acoustic noise in the environment near the frequencies of ringing, automatic gain controls, or dynamic filters. Ringing can also be influenced in the short term by the movement of reflective and absorptive objects in the environment, such as the movement of a person close to a microphone or a speaker. If these ringing-influencing factors are present, systems of feedback detection such as those described herein may be designed to provide more reliable detection by allowing for some deviation from a logarithmic or steady decay, or by allowing for interruptions or variations in the rate of decay of feedback that may be present.

Although not necessarily prior-art, the following references are presented to help to understand and appreciate the systems and methods described herein, each of which references is hereby incorporated by reference as background material. U.S. Pat. No. 6,798,754 to Farhang-Boroujeny, U.S. Pat. No. 5,442,712 to Kawamura et al., U.S. Pat. Publ. No. 2004/0179387, U.S. Pat. No. 5,717,772 to Lane et al., U.S. Pat. No. 5,245,665 to Lewis et al. and U.S. Pat. Publ. No. 2006/0159282 to Borsch.

U.S. Pat. No. 6,798,754 to Farhang-Boroujeny describes a howling detector that uses frequency bins, whereby if the bins manifest a frequency level over a threshold for a period of time howling is detected, and attenuation is applied at the bin-frequency of howling. The frequency bins are charged through the use of frequency decomposition using a Fast-Fourier Transform. Farhang-Boroujeny's method is capable of detecting howling on more than one frequency, as the threshold is applied on a per-bin basis.

U.S. Pat. No. 5,442,712 to Kawamura et al. discloses a howl suppressor and detector also using frequency decomposition in the application of a notch filter at a frequency calculated from detected frequency levels. A digital notch filter may be substituted with its analog equivalent, for example in U.S. Pat. No. 5,245,665 to Lewis et. al. a switched capacitor system is used.

Rather than application of attenuation at the frequency of a detection bin, Borsch uses a simple interpolation method using the levels of adjoining bins to detect more precisely the frequency of feedback.

The application of a FFT is equivalent to the application of a series of band-pass filters. For example, U.S. Pat. No. 5,910,994 to Lane et al. discloses a variation of a frequency detector system that uses a sequence of bandpass filters arranged in a tree.

BRIEF SUMMARY

Disclosed herein are detectors of audio ringing feedback, that is decaying feedback with a gain of less than one, those detectors utilizing a repeated gain measurement that applied to a range of gain values characteristic of ringing-type feedback. Those gain measurements, while in the range, increase a probability measurement of feedback. When the probability of feedback reaches a threshold, a detection of feedback is made and feedback countermeasures, such as the application of a notch filter, may be applied. Optionally, the audio gain around likely frequencies of feedback may be enhanced for a time to increase the resolution of identification of a feedback frequency, which may be identified through an interpolative method. Repeated gain measurements may also identify building-type feedback. A ringing detector may include more than one range of detection, for example for building, strong-ringing and weak-ringing feedback.

BRIEF DESCRIPTION OF THE DRAWINGS

FIG. 4 shows a characteristic strong-ringing feedback waveform.

FIG. 5 shows a characteristic weak-ringing feedback waveform.

FIG. 6 is representative of the relationship between gain and amplitude in an amplifier system.

FIG. 7 illustrates the components of a feedback suppressor system with basic frequency identification.

FIG. 8 illustrates the components of a feedback suppressor system with interpolative frequency identification.

FIG. 9 is a set of equations representing an exemplary polynomial solution of frequency interpolation from a set of frequency amplitude bins.

Reference will now be made in detail to particular implementations of the various inventions described herein in their various aspects, examples of which are illustrated in the accompanying drawings and in the detailed description below.

DETAILED DESCRIPTION

Prior methods to howling and feedback are more or less remedial in nature; they wait for an objectionable feedback event to occur and then take remedial measures. As will be seen, the systems and methods described herein are more proactive than these prior methods, in that countermeasures to feedback can be employed before a feedback event causes an interruption to meeting participants in many cases.

Figure 1:
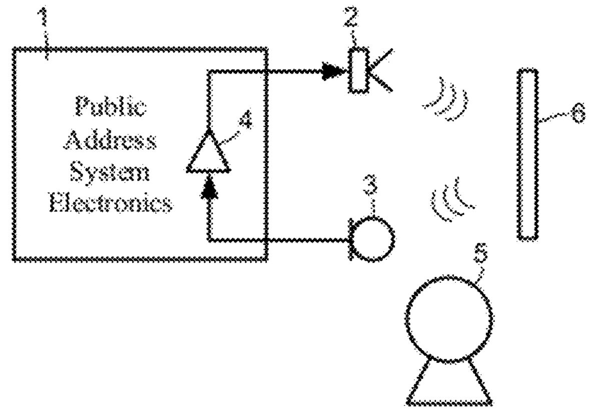
FIG. 1 shows the ordinary components of a public address system.
Figure 2:
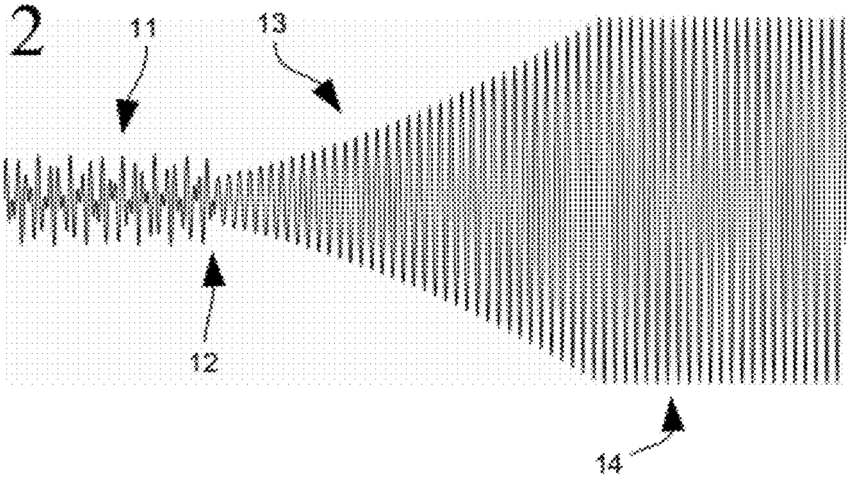
FIG. 2 shows a characteristic strong building feedback waveform with howling.

FIG. 7 depicts the elements of an exemplary generic feedback suppressor for the purposes of this discussion, which are a buffer 21 which is fed a series of samples $X_n$ representing the input at one or more microphones. It is to be understood that samples $X_n$ might come directly from a microphone, but those samples could also come from a signal delivered to a speaker or an intermediate signal, so long as those signals are from a microphone in the sense that a microphone is included in the signal path as an input. It is also to be understood that a microphone may be a microphone in the traditional sense, but could also be any signal-producing device that receives as input sound. At certain times a discrete fast Fourier transform 22 is taken, resulting in the filling of m bins 23. A feedback detector 24 examines these bins 23 and attempts to identify a bin or bins that feedback has affected. For example, if the waveform as depicted in FIG. 2 had reached the saturation stage 14, the bin containing the frequency of feedback would read at an appreciable level. In that event, the frequency corresponding to the bin that measured high is passed to a controller 25, which commands that the gain at or about that frequency be reduced, in this example by a feedback suppressor 26 which accepts as input a frequency and applies a filter, such as a notch filter, to the incoming samples $X_n$ before they reach speaker 27. A speaker, for the purposes of this disclosure, could be a speaker in the traditional sense but could also be any device that imposes feedback on microphones in a system, whether that feedback is audible or not. It is also to be understood that a feedback suppressor may apply suppression at more than one frequency, for example to two or more frequencies in different bins.

Now described are several components and/or methods of the instantly presented exemplary feedback suppressors. These description below is merely to facilitate presentation of these components, and these need not all be employed in a system to be effective. Rather the benefits of these components may be enjoyed separately, and a system employing all or some of these is not required.

Interpolator

In a simpler method the frequency for which suppression is applied is the same as the center frequency of the bin of detection. In that method, a fairly wide notch filter is used to ensure that suppression is achieved for the range of frequencies that the bin represents. The use of a wide notch filter, however, carries the disadvantage that a relatively wide range of frequencies are affected, which may be perceived by meeting attendees as a drop in audio quality. This can, for example, make the audio output sound muffled or tinny depending on the frequency of feedback.

In an alternative method, a relatively large number of frequency bins are used, for example 512 in a system having a sampling frequency of 8,192 Hz, which reduces the range of frequencies that are encompassed by each bin. In this alternative each bin effectively covers a few hertz, and thus narrower filters may be used. The disadvantage of this approach is that the repetitive computation of such a large set of bins is expensive and precludes the use of simple processors, i.e. those operating at a lower frequency and/or not including an array processor or digital signal processing unit.

A method of interpolation can be used in a system having fewer bins, improving the resolution of feedback frequency identification while conserving available processing power and potentially permitting the application of a narrower notch filter than that for a feedback detector with bin-width resolution. Now referring to FIG. 8, the interpolating system includes the same m bins 23 fed to a feedback detector 24. A bin may exhibit behavior indicative of feedback; in this example the frequency range of bin $f_n$ has been determined to contain a feedback frequency. However, in performing the FFT there is some spillover into neighboring bins $f_{n-1}$ and $f_{n+1}$. The interpolated method relies on the property that if the frequency of feedback is closer to the frequencies represented by one of the neighboring bins, that bin will tend to have a higher reading than the opposite bin. In the exemplary method only the neighboring bins with an offset of one are considered, however interpolation could extend farther for example to the nearest four or six neighboring bins providing perhaps more accuracy. Many methods of interpolation are possible, however the interpolation method presented here is one based on the second order polynomial curve best fit in the least-squares sense. This method has been found to provide good accuracy while also conserving processor bandwidth. Particularly, the second order polynomial curve solution has been noticed to be more accurate than those of a different order.

In the method presented here, the matrix equation (a) of FIG. 9 represents the relationship between the bin frequencies $f_n$ and the FFT magnitude values $Y_n$ as measured at a time when feedback in the center bin has been identified, where n=2 is the center bin, and n=1 and n=3 are the neighboring bins. $P_1$, $P_2$ and $P_3$ are the coefficients of a second order polynomial that fits the three set of values $(f_1, Y_1)$, $(f_2, Y_2)$ and $(f_3, Y_3)$. In FIG. 9, the vector equation (b) can be rewritten as (c), providing a solution for the polynomial if the frequencies and magnitudes are known.

For this example, the bin frequencies are uniformly spaced because they are produced from an FFT. Because of this, the vectors f and $f^2$ in the equation can be composed of offset values from a fixed frequency, for example $f_1$, in which case a general solution can be obtained independent of where the bin set occurs in the spectrum. A general solution for the vector P appears in equation (d) of FIG. 9, from which the polynomial can be determined through a relatively few number of arithmetic operations on the magnitude values appearing in the bin set.

Once the polynomial coefficients are known, intermediate values that lie between frequencies $f_1$ and $f_3$ can be approximated by evaluating the polynomial at some value between the numbers one and three. For example, the FFT magnitude that would occur at the center frequency at the transition between $f_1$ and $f_2$ can be found by evaluating the polynomial at 1.5. The identification of the frequency of feedback may be obtained through a converging iterative method on the resulting polynomial equation, or by another method such as by normalizing $P_1$ to one and performing a table lookup on the vector P.

Probabilistic Feedback Detector

As mentioned above, some methods of feedback detection inherently wait for noticeable feedback to occur before taking corrective action. Methods presented here are probabilistic, meaning that they proactively identify feedback events before a definitive identification can be made based on the full effects of feedback. For example, methods of identifying feedback having a gain of more than one are presented which can produce howling, but that identification can occur before howling occurs on a probabilistic basis.

Figure 10:
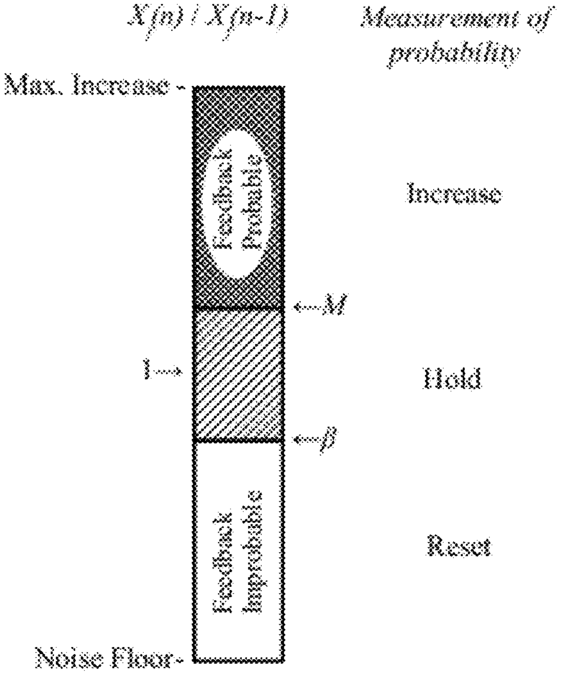
FIG. 10 illustrates an exemplary scheme for detecting building-type feedback using frequency-amplitude gain measurements.

In a first probabilistic method of feedback identification, frequency bins are periodically filled as in the system of FIG. 7. However, rather than applying a time-measured threshold to a series of frequency bin measurements $X_f$, this method considers the difference between two consecutive bin measurements $X_f(n)-X_f(n-1)$ according to the scheme shown in FIG. 10. Recalling FIG. 2, the region 13 of feedback building is characterized by a steadily increasing amplitude at the frequency of feedback. The amplitude range shown in FIG. 10 is divided into three regions between the levels of maximal increase and the noise floor by M and β, which are as follows. The first region of improbable feedback extends from the noise floor up to β, in which the amplitude around the bin frequency is decreasing sufficiently rapidly that building feedback is unlikely. If a difference measurement occurs in this region, the method resets the measurement of probability. The next region of probable feedback encompasses difference measurements above M, for which feedback is considered probable. A difference measurement occurring above M is not a definitive determination of feedback, but merely an indication that feedback may be occurring at this bin frequency. A sufficiently long succession of difference measurements above M may indicate that feedback suppression is appropriate. Therefore, this method increases the measurement of probability for difference measurements above M for further consideration. Once the measurement of probability is appropriately high, a feedback suppressive action may be taken.

The region between M and β is a region of uncertainty for which special consideration is applied. The reasons for this are two. First, there is noise in the measurements due to the combination of the noise sources in the system, i.e. white noise and quantization noise, and noise attributable to the FFT computation. Second, the incoming signal may or may not contain speech components at the bin frequency, and in some cases a speech component may partially cancel a feedback event. Note, however, that under conditions of both speech and feedback difference measurements may occur more in the first region than in the region of uncertainty. For this region of uncertainty this exemplary method holds the measurement of probability. Alternatively, the change in the measurement of probability could be graduated, for example by applying a smaller increase or decrease at near the center of the region. To enhance the detection of a building magnitude even in the presence of noise, the current sampling measurement may be discarded and replaced with the previous sampling measurement, permitting a comparison to extend over several measurement/FFT cycles.

Figure 3:
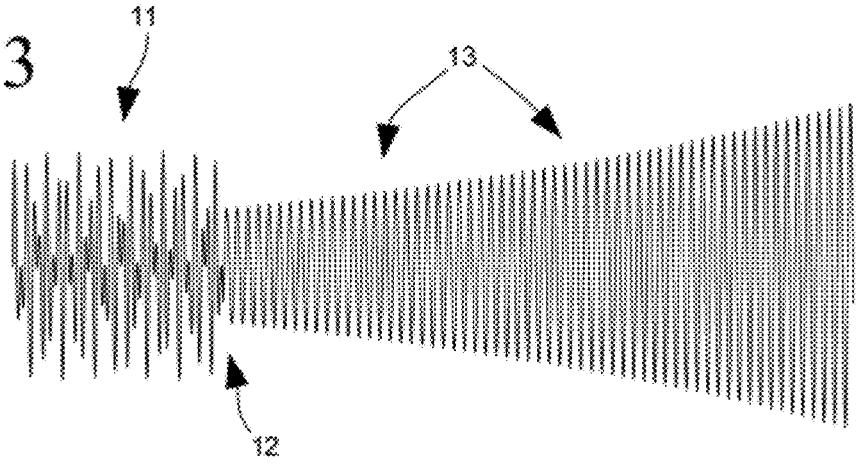
FIG. 3 shows a characteristic slow-building feedback waveform.

In the scheme of FIG. 10, M and β may be selected by analysis and calculation, but are probably better selected and/or refined through operational testing. M should be selected to be greater than about 1, with the following tradeoff in mind. An M of about 1 will detect more gradual feedback and will trigger earlier detection, while increasing the chance of false detection of feedback on a speech pattern of rising volume, for example a musical swell. An M of greater than one will reduce the chance of false feedback detection, but may miss gradually increasing feedback such as that discussed in connection with FIG. 3. Likewise, a β value that is too large may cause late detection of feedback due to resets to the measurement of probability on speech interference. A β too small may falsely detect feedback where a signal is received that diminishes slowly. β should be selected to cause an accurate reset most of the time, so as to make false-rejection of feedback unlikely under normal operation. Note also that the region of uncertainty may be reduced if the input to the FFT is made larger (i.e. considered over more samples), and thus it may be advantageous to consider a larger input sample to reduce noise and bring M and β closer together.

Furthermore, it may also be useful to recognize in the selection of M and β that relationship of the amplitude to the feedback gain of a system, which is generally as shown in FIG. 6. In a perfectly linear system the feedback gain would be a constant regardless of the amplitude. However, in the real world amplifier efficiencies decrease as saturation is approached, which decreases the gain. The selection of smaller M and β values may be favored to broaden the number of potential detectable feedback events over the range of possible gains, particularly where it is expected that amplifier saturation may occur.

Figure 15:
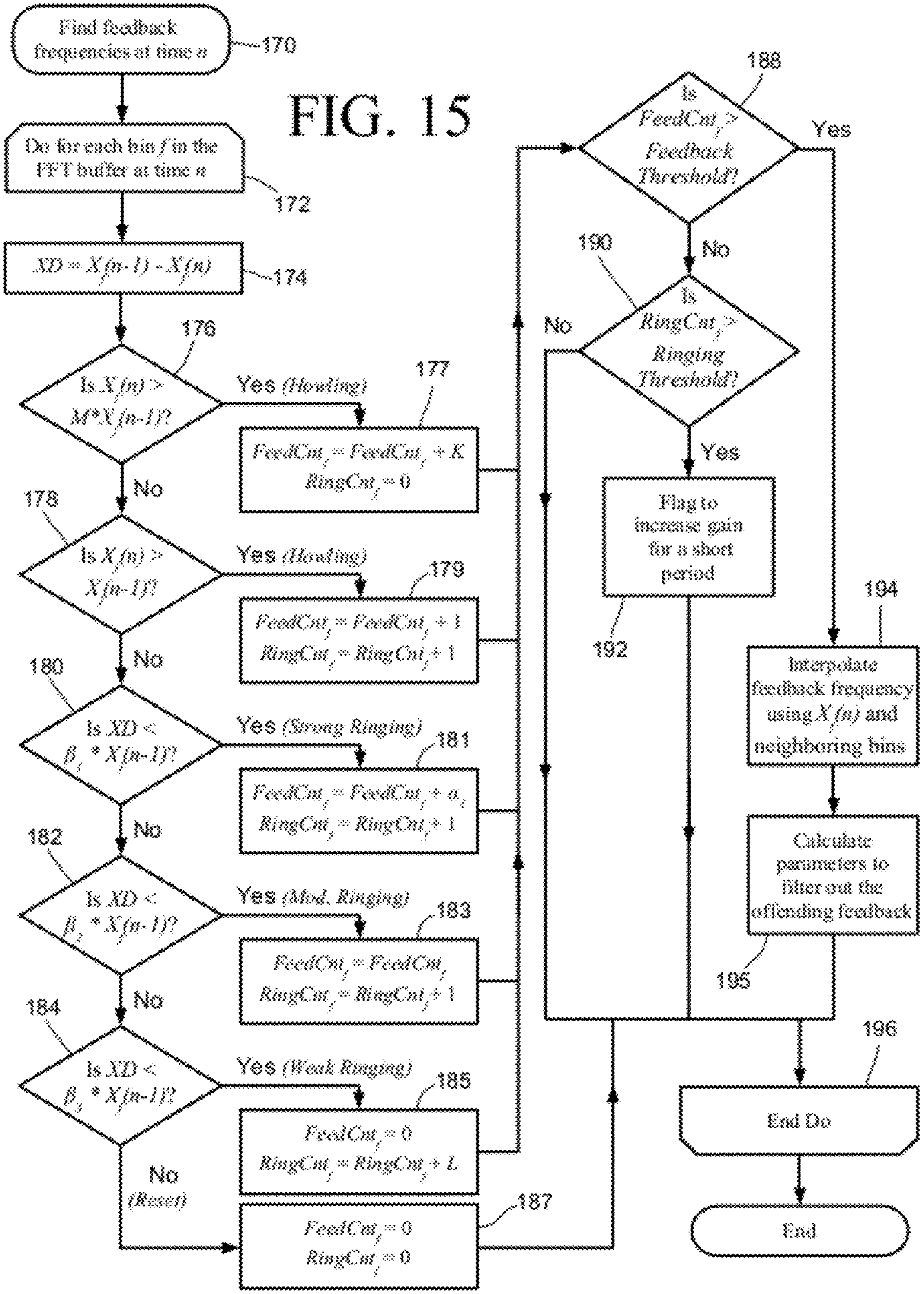
FIG. 15 illustrates an exemplary method of detecting feedback of several kinds including howling, building-feedback, strong ringing, moderate ringing and weak ringing.

Note that alternatives to this method may be devised that are within the scope of the invention, for example having more or less regions; the exemplary method of FIG. 15 uses two regions for moderate and rapid building feedback. Similarly, the measurement of probability may be a floating point number, but in a more microcontroller-friendly form it is a counter as in the examples described below.

Figure 12:
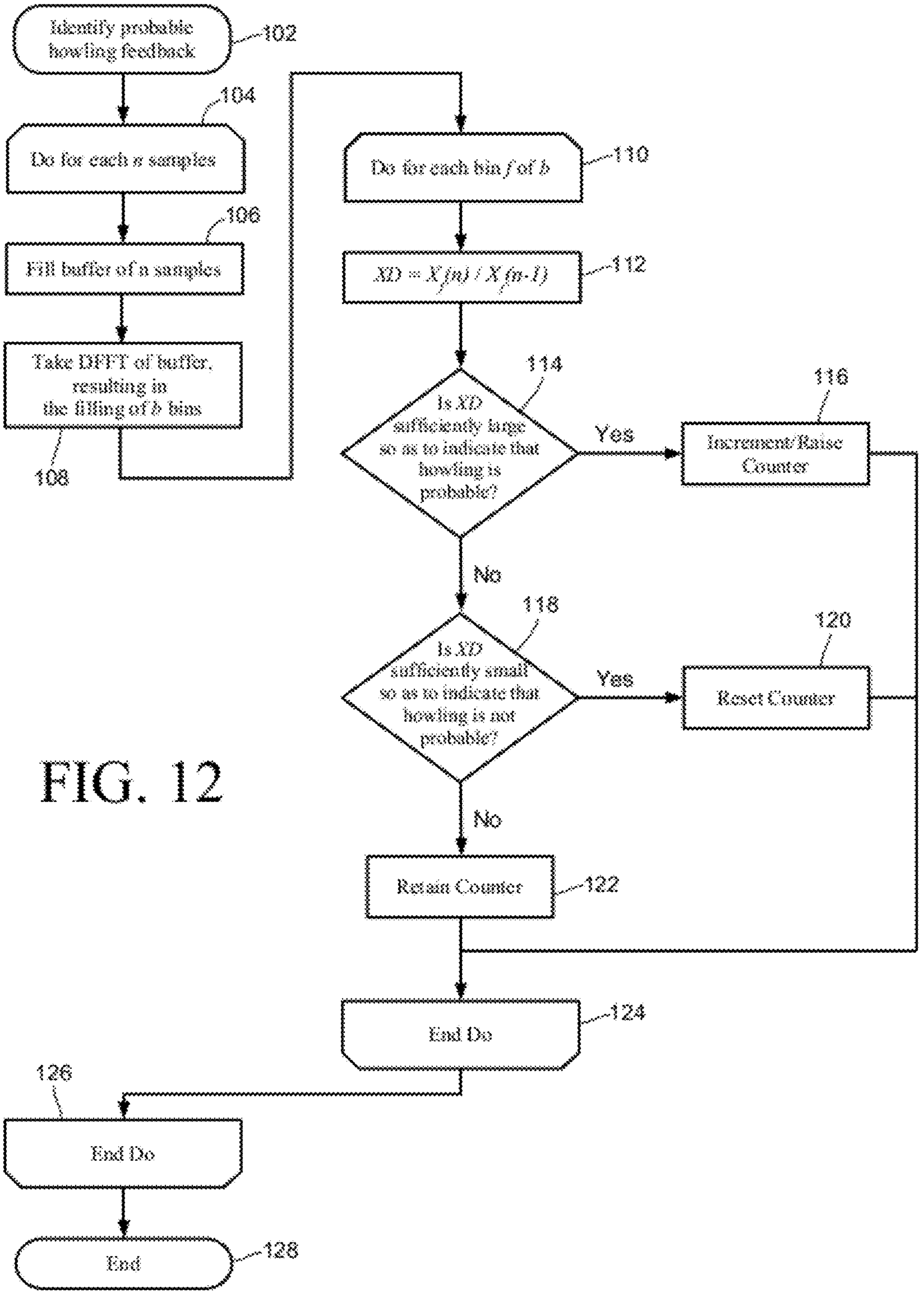
FIG. 12 illustrates an exemplary method for detecting building-type feedback from frequency-amplitude gain measurements.

FIG. 12 depicts an exemplary method using the scheme of FIG. 10 in the form of a flowchart, which is generally as follows. A loop defined between steps 104 and 126 is performed from time to time, generally as n samples are received but not yet been considered. Thus, from time to time a buffer of n samples is filled 106, and the FFT is taken of the samples in that buffer 108, resulting in the filling of b frequency bins with the magnitude corresponding to the amplitude of the frequencies corresponding to a bin. After the filling of the frequency bins a loop is performed between steps 110 and 124 for each bin f. First, a magnitude difference XD is computed 112, which is a comparison between the present magnitude in f against the previous magnitude. Here, that comparison is performed through division, producing a scaled difference, however a comparison could be performed in many other ways such as by simple subtraction.

Having computed XD, consideration is made 114 to see if XD is sufficiently large that it indicates that howling and/or feedback is probable (in this context, probable means mild probability that there is some chance that feedback is present and, if it persists for a period of time, feedback is likely.) If XD is sufficiently large a counter corresponding to the probability of feedback for bin f is incremented, and in alternative methods if XD is very large the counter may be raised by more than one. If XD is not sufficiently large than consideration is made 118 to whether XD is sufficiently small that howling and/or feedback is not probable. If that is the case, the counter is reset 120. Otherwise, the bin counter is retained 122 for the next iteration of the loop.

Periodically or as desired, the set of bin counters may be examined individually to determine feedback events and the application of feedback suppression. For example, a bin counter exceeding a threshold may prescribe feedback suppression at the frequencies corresponding to that bin. Other more complex methods may also be used better adapted for a system, as desired.

Ringing Detection

Introduced above is the concept of ringing under conditions of feedback having a gain less than one. In other words, ringing feedback occurs in a range where the gain of the feedback is less than one (not building feedback) down to a level where ringing is not noticeable, which might be at a low level that occurs with ordinary room acoustical reflections. Amplitude thresholding-type methods are not inadequate to the detection of ringing, generally because ringing feedback does not exceed the amplitude of the feedback-initiating speech or sound. Thus in the past it has been difficult to detect. Now described herein are methods of detecting ringing-type feedback using a difference method between successive frequency time division volume measurements.

Figure 11:
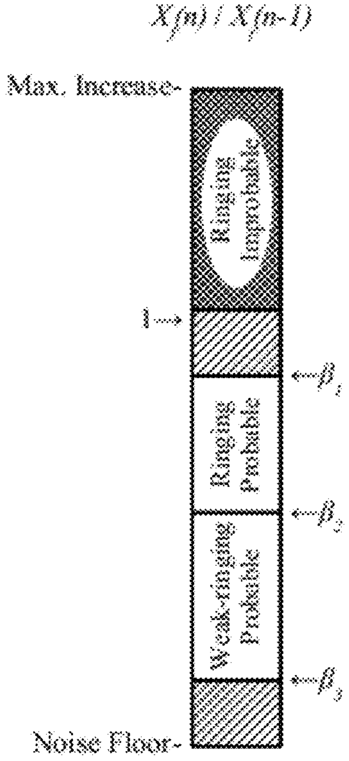
FIG. 11 illustrates an exemplary scheme for detecting ringing-type feedback using frequency-amplitude gain measurements.

Now referring to FIG. 11, a scheme of detecting ringing is visually depicted on a scale of gain values in a set of frequency-spectrum divisions. The methods described below utilize a discrete fast-fourier transform (a DFFT or simply FFT) to create a series of these divisions, however other methods can be used such as a series of analog or digital filters among others. As the methods below utilize an FFT to produce frequency divisions, these methods refer to frequency amplitude "bins"; it is to be understood that other frequency division methods could produce other kinds of volume measurements and the methods are not limited to the particular implementations described herein. The methods herein calculate a gain or a difference, which in the examples are difference values between amplitude bin values at two successive or contemporaneous times, with the intent to capture a change in a series of bins for analysis. In the example a difference calculation uses division, but could use another operation such as subtraction. It is also to be recognized that the comparisons for different frequencies need not occur at the same times, rather these volume or change measurements can be offset and might also occur over a different number of samples depending on the frequency.

Now returning to FIG. 11 and working down from high to low, the first region between about one and the maximal increase is a region where ringing is improbable, because the bin frequencies are increasing rather than decaying. This may occur where independent speech or sound appears at the microphone, as would be expected to ordinarily occur at times while the system is being used. This may also occur where there is feedback coupled with a gain of more than one, which may be detected using the feedback detector described above or by another method. The treatment of measurements in this area depends on the application. For example, if the detector is intended to strictly detect ringing the measurements in this area may be used as a trigger that indicates that something other than ringing is occurring. On the other hand, a feedback detector that detects both ringing and howling-type feedback may hold state or increase an indicator in accordance with the detector design goals.

The region between about equality (1) and a first threshold $\beta_1$ is a region of uncertainty because system noise may prevent making a definitive judgment as to whether ringing is occurring. For example, during ordinary speech the magnitude level of the frequency bands will fluctuate, and thus there may be a certain range around equality having a lack of information for the determination of ringing. Even so, a ringing detector need not have this region of uncertainty to be effective, but may be helpful to bring more rapid detection of ringing even in the presence of some non-feedback sound. Note also that this region may extend above the equality value (1) to cover the case where non-feedback sound or noise causes the difference measurement to rise near or above constant measured gain. The selection of $\beta_1$ is a design choice: a larger value will detect more slowly decaying ringing events while at the same time increasing the likelihood of false detection on a decaying independent sound such as a musical diminuendo. In a system having a feedback suppressor with narrow effect (i.e. applying a narrow notch filter) it may be preferable to select a higher $\beta_1$, as the effect of false detection is lessened.

Between the difference magnitudes $\beta_1$ and $\beta_3$ is a region where ringing is probable, but again a single difference measurement within this region is not determinative. Rather, a detection method may use a series of difference magnitudes within this region as an indication that ringing has occurred. The selection of $\beta_3$ is also a design choice, but should probably be selected above the noise floor of the system. In the selection of $\beta_3$ the designer should recognize that some ringing will occur at virtually every frequency in any closed environment, which is generally thought of as the acoustics of a room. This kind of ringing is not necessary to suppress, as it provides audible cues to the room environment (i.e. makes an auditorium sound like an auditorium and a small room sound like a small room) and does not substantially affect the understandability or enjoyment of listeners to the sound output. However, at some point listeners will become bothered or fatigued by ringing, which point may indicate the best value of $\beta_3$.

Also in the ringing-probable region are two subregions defined by the variable $\beta_2$, in this example. The division of the ringing-probable region as shown is not necessary, but may help in the following manner. The region between $\beta_1$ and $\beta_2$ will be encountered for long-period ringing, which is ringing that decays relatively slowly such as that shown in FIG. 4. For the case of long-period ringing, there is much opportunity to receive difference measurements because the ringing extends for a relatively long period of time and the difference measured remains about the same (i.e. it decays substantially like a sloped line.) Long-period ringing is perhaps the easiest kind of ringing to detect, as measuring it is more certain and may be through the use of a counter or timer detecting the time in the ringing probable region.

Short-period ringing, or weak-ringing, is perceived less by a listener and is also less detectable. This is mainly because the decay is faster, meaning that less time is available to hear or detect it before it decays into the noise floor. For the region between $\beta_2$ and $\beta_3$ a method may accelerate the rise of the ringing indicator to permit detection in this shorter period. Note that the same feedback suppression may be used for both long and short-period ringing, however milder suppression for weak-ringing may also be used. $\beta_2$, if used, should be selected to maximize the detection of weak-ringing events while not causing false detection of long-period ringing events. Note also that the use of two ringing-probable regions is merely exemplary, and more than two regions with multiple accelerations may be used, if desired.

Generally speaking, the triggering change characteristic such as the gain will need to be stable for a period of time to ensure that the probability that successive gain measurements are actually caused by feedback and not by a rising or falling tone. In other words, it is important that the gain measurements dwell within a range of characteristic feedback, otherwise detection of feedback is likely inappropriate. For that purpose, a period may be selected for which gain values must dwell before detection of feedback is made and before feedback countermeasures are engaged. It is to be understood that such a period may be different for different frequencies.

Ringing Detection by Temporary Feedback Enhancement

Recognized by the present concepts is that feedback may fluctuate in an environment above and below one, and that howling feedback may turn into ringing feedback and vice versa. For example, a person speaking may notice that a public address system is howling and physically cover the microphone to interrupt the feedback path, for example with his hand. Should a system not detect howling before the feedback path is in rapid rise, the problem will persist and the path-interrupter will need to be present. On the other hand, ringing type feedback can become howling through the repositioning of objects in the environment between the microphone and the speaker. In the amplitude-threshold methods, this is dealt with by waiting for ringing to become howling, where a detectably large amplitude will be present.

Where a ringing detector is used, it is possible to eliminate some strong feedback and/or howling in a system before it occurs through the use of proactive or predictive suppression. Discussed above are long-duration and short-duration ringing events and the detection of such. A system may proceed to suppress all frequencies corresponding to of bin where ringing has been detected, for example through the use of a notch filter that substantially covers the bin frequencies. Alternatively, method of interpolation may be used such as the one given above, provided that the levels of detection provide for an accurate interpolation. However, for short-duration ringing events it may be that the amplitude levels of adjacent frequency bins are too low to provide an accurate calculation, or in other words the signal to noise ratio is too low.

Considered in the systems and methods described herein are enhancements to improve this signal-to-noise ratio. In a first method, interpolation occurs over the sum of several short-duration ringing events in an effort to average out the noise. This method has the disadvantage that a period of ringing must be left unsuppressed potentially affecting the perceived quality of the system, and that accumulated noise may still affect the magnitude measurements.

In another method, enhancement of the signal-to-noise ratio occurs through gain enhancement, which is generally described as follows. A system is allowed to detect ringing events, and on the detection of ringing event the gain of the system is enhanced thus turning a ringing event into a feedback-amplifying event. By gain enhancement, the decaying-type feedback becomes building feedback that improves the signal to noise ratio of measurements for the interpolator. The system may, if desired, pre-filter out ringing events that have sufficient signal and/or bin magnitude and apply interpolation without gain enhancement. But in the simple case, gain enhancement may be applied to any detected ringing event. The gain enhancement may be enhancement of the system gain across all frequencies, or alternatively the gain a frequencies corresponding to the bin of detection and adjacent ones may be enhanced by a band-enhancement filter. Such a band-enhancement filter is preferably designed to have a substantially flat response over the frequencies where bin measurements are used as interpolator-input, and may be a band-pass filter.

This gain enhancement occurs for a time, after which the interpolation operation is performed on presumably strong data values. This period of time may be fixed, and at the end of the fixed period the interpolation is done and the gain is restored. If that method is used, the designer should allow for a period of increase in a feedback signal of week-ringing corresponding to the gain enhancement and the accuracy needed in the interpolation calculation; however this period preferably does not extend so long that participants are caused distraction or discomfort. Preferably, the period of gain enhancement is sufficiently short that it is not noticeable to listeners, but is still long enough to provide an accurate determination of feedback frequency. In another alternative, the gain enhancement extends for a number of seconds to permit likely continuing audio activity at the microphone to initiate a feedback event. In yet another alternative, the amplitude of the bin and optionally the surrounding ones may be monitored and when sufficient amplitude is reached the interpolation may be commenced and the gain enhancement terminated.

The period of gain may also be terminated by a secondary feedback or ringing detection. For example, the gain enhancement may be sufficiently strong that the feedback is made to have a gain over one. In that case, the building feedback detector described above using magnitude differences may be used, or even a feedback detector using amplitude thresholding will provide an appropriate detection. The feedback detector, regardless of the type used, may be used to identify the frequency of feedback using its ordinary methods. The detection and processing of feedback may determine the termination of any gain enhancement at the corresponding bin. The period of gain may also be outwardly-bounded so that if ringing was falsely detected, the system does not continue to operate in the gain-enhancement mode but rather returns to a normal state.

Figure 13:
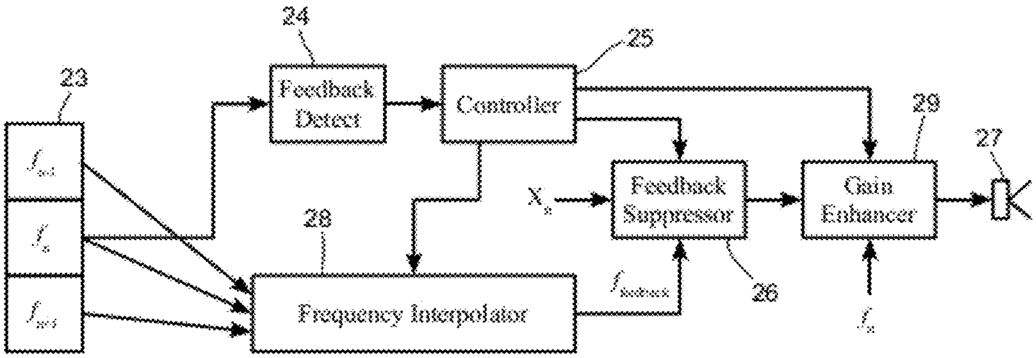
FIG. 13 illustrates the components of a feedback suppressor system with interpolative frequency identification and gain enhancement.

It is useful to consider these concepts relative to the system as shown in FIG. 13. There, a feedback detector periodically determines a ringing event on the basis of the behavior of a frequency bin n over time. When a weak-ringing event is detected, a signal is sent to a controller 25 that commands a temporary gain through amplifier or band-enhancer 29. Note that amplifier 29 could be the output amplifier of speaker 27, a preamplifier, a computational amplification on a digital audio stream, the application of a band-enhancement filter, or another filter, device or method providing gain at and about $f_n$ of bin n. In this example, amplifier 29 amplifies only about at the frequency band defined by $f_n$ to avoid unwanted effects at other frequencies.

At some future time, controller commands amplifier 29 to restore normal amplification, at which time frequency interpolator 28 is commanded to sample bin n and its neighboring bins and perform interpolation to more accurately identify the frequency of feedback. Having identified that frequency, it is communicated to a feedback suppressor 28 to suppress the feedback.

Figure 14:
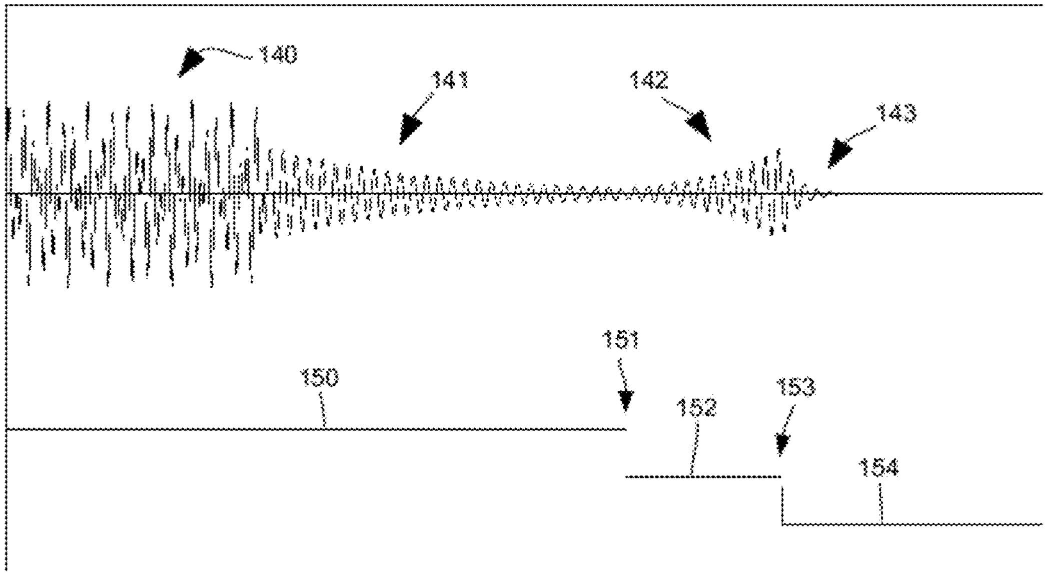
FIG. 14 shows the states of an exemplary feedback suppressor system with gain enhancement and a representative feedback waveform.

Now turning to FIG. 14, the states and audio waveform are conceptually shown for a system that implements temporary gain enhancement for weak-ringing feedback detection. The system begins in a normal detection state 150 during which no gain enhancement is applied. Some speech activity 140 may cause a weak-ringing event 141 which may be detected by the methods described above. A transition occurs 151 when a ringing event for a weak-ringing event is detected, and the system enters a second state 152 during which gain enhancement is applied. Feedback, although decaying in region 141, now increases in amplitude in region 142 while gain enhancement is applied. This gain enhancement continues for a time to allow the collection of samples for a new Fast-Fourier Transform at an amplitude allowing for good resolution above the noise floor and allowing for a more precise determination of the frequency of feedback, for example by an interpolative method. A transition 153 occurs from state 152 to 154 following this FFT and potential interpolation. Having identified the frequency of feedback, in state 154 feedback suppression is applied causing the waveform 143 to decay rapidly.

The time the system remains in state 152 is dependent on a number of factors and can be fixed or varied. In one method, the state 152 is persisted for a fixed period that is calculated to allow the wave 142 to build to an acceptable signal-to-noise level while avoiding unnecessarily bothering the ears of listeners with long or loud tones. It should be appreciated that the ultimate amplitude of the feedback wave 142 will depend on the gain of the system and the gain enhancement, and therefore some discretion and/or experimentation may be needed to come to a working balance. In an alternative method the state 152 is terminated upon detection of a suitable amplitude, which may be by a monitoring of the corresponding frequency bin or simply by a monitoring of the broadband amplitude generally.

Exemplary Method

Now referring to FIG. 15, an exemplary method incorporating the above-presented concepts appears, which method is suitable for a system having a CPU or microcontroller where a floating-point unit is absent and fixed-point math is used, although it may be implemented using floating-point math if desired. It is to be recognized that the methods described herein are not limited to any particular processor type, but rather these methods may be adapted for any processor, circuitry or hardware having sufficient processing power in the digital or analog domains that is appropriate for the particular application of use. In the method of FIG. 15, magnitudes are expressed as fixed point unsigned integer values and comparisons are made in the integer domain; again, floating point math may be used if desired. This method begins at step 170 which occurs periodically after a FFT has been taken, potentially by a separate array processor or other unit. The loop between steps 172 and 196 is performed for each bin in the FFT buffer.

The first loop step is to determine a difference calculation representing the difference between the current in magnitude and the previous one. Although in a method described above division is used, this method uses subtraction compatible with integer-math unit. The method first performs a comparison 176 to see if the present magnitude is more than a multiple M of the previously-measured magnitude. If so a feedback counter $FeedCnt_f$ is incremented 177 by a constant K. If that comparison fails, a comparison 178 is next made to see if the magnitude of this band has increased over the previous reading. If so, the feedback counter is incremented 179. Note that in alternative methods, a feedback counter may not be incremented by one, but rather it may accumulate a different value. Comparisons 176 and 178 are used to detect howling events, whereupon a substantially continuous rise in been magnitude will cause the feedback counter to raise and at an appropriately high level determined with sufficient probability that howling is or is about to occur. The value M defines a level of increasing amplitude above which rapid howling is likely, i.e. a building feedback that will quickly result in howling. This method recognizes that repeated increases in large magnitude, even though over a shorter period, are indicative of howling-type feedback, and thus the feedback counter is allowed to rise faster. The selection of K is system and environment dependent, and should be selected to avoid rapid howling events while at the same time avoiding false detection of feedback.

Moving on to step 180, in the event the magnitude is not detected to be rising a comparison to the calculated difference is made to see if the amplitude is decaying at a slow rate defined by $\beta_1$. $\beta_1$ defines a region of decay that is close to unity gain, where building feedback or ringing feedback are likely when noise and/or non-feedback audio elements are considered. If the comparison 180 indicates that the decay is sufficiently slow, the feedback counter is raised by $\alpha_1$ to supplement the existing probability of building-type feedback, and a ringing counter RingCnt is incremented by one to indicate an increased probability of ringing 181. Again, here as in other locations of the method, a counter may be increased by a value other than one. Here, the value of $\alpha_1$ is smaller than the increment of the feedback counter, i.e. $\alpha_1 \leqq 1$. The selection of the $\alpha_1$ value is dependent on the expected noise and feedback-independent audio that is likely to occur and the rapidity that mildly building or decaying feedback is to be detected.

If that comparison yields a false result in a comparison is made against a $\beta_2$ variable that represents moderate ringing. Thus, if the decrease in magnitude is between $\beta_1$ and $\beta_2$ is more likely that the system is ringing rather than howling. But even so, the feedback counter is maintained 183 so that if this reading is spurious the progress toward detecting building feedback is not lost. The ringing counter is incremented reflecting a higher probability that ringing is occurring system. If moderate ringing is not detected, a further comparison 184 is performed to detect weak-ringing that has a magnitude drop between that defined by $\beta_2$ and $\beta_3$. If this rapid-type decay is detected, the system presumes that building feedback is not present in the feedback counter is reset 185. As weak-ringing is detectable only for a very limited time, the ring counter is incremented by a factor L which is chosen to be large enough to detect weak-ringing events before they decay beyond detectability and small enough to allow the accumulation of probability and avoid erroneous weak-ringing detection. If the magnitude drop is too rapid for any of the above comparisons, the method presumes that no feedback is occurring in both the feedback counter and the ringing counter are reset 187 and this loop iteration terminates for the next magnitude reading.

If any of the comparisons yielded a true result, the feedback counter is compared against a threshold 188 to see if the probability counter has built up to a level that indicates that a determination of building-type feedback is appropriate. If yes, the method performs interpolation 194 and sets up a feedback-canceling filter 195. If the feedback counter is below its threshold, the ringing counter is compared against a ringing threshold 190. Note that in some cases the amplitude of weak-ringing may be sufficient to accurately determine a feedback frequency, but in this method it is not yet done. Rather, this method simply flags a period of gain enhancement 192 to identify the frequency of feedback through building-type feedback detection. The gain enhancement may be a broadband gain, or it may be narrower, for example a gain enhancement to frequencies corresponding to a bin or bins in or near which feedback is detected.

Now although particular systems, functions and methods have been described above, these are adaptable to other audio systems having a potential feedback loop and thus the inventions are not limited to the particular implementations described herein. Likewise, although the described functions have been described through the use of block diagrams and in hardware, one of ordinary skill in the art will recognize that most of the functions described herein may be implemented in software as well. Additionally, the exact configurations described herein need not be adhered to, but rather the diagrams and architectures described herein may be varied according to the skill of one of ordinary skill in the art. Moreover, although reference is made to electronics, circuitry and software in the exemplary systems, it is to be recognized that audio functions implemented in electronics/circuitry may often be implemented in software, and vice versa, and thus it is considered within the scope of the inventions that software elements might be implemented in electronics with or without a processor executing software, and electronic aspects can likewise be implemented in software. It is furthermore understood that the summary description and the abstract are provided merely for indexing and searching purposes, and do not limit the inventions presented herein in any way.

The invention claimed is:

1. An amplified system incorporating a suppressor against ringing feedback, comprising:

- a microphone;
- a speaker;
- an amplifier connected to said microphone and said speaker in a way such that sound received at said microphone is produced at said speaker under amplified power;
- a frequency level detector configured to provide a volume level with respect to a plurality of frequency-spectrum divisions;
- a gain determiner configured to compute the gain between two measured volumes of sound at frequencies of potential feedback measured at two contemporaneous times; and
- a ringing detector functional to evaluate the computed gain at a plurality of frequency divisions, wherein each gain evaluation produces a positive indication of ringing in association with a frequency division where the corresponding computed gain about that frequency division remains substantially within a ringing range for a first preselected period of time;
- wherein said ringing detector incorporates a measure of probability of present feedback for each of the plurality of frequency-spectrum divisions.

2. A ringing-feedback suppressor system according to claim 1, wherein for each of the plurality of frequency-spectrum divisions said ringing detector repeatedly updates the measure of probability as gain values are produced and further wherein a positive indication of ringing occurs at a time when the measure of probability exceeds a threshold.

3. An amplified system according to claim 1, wherein said ringing detector uses a ringing range that is bounded by a $\beta_1$ and a $\beta_2$, where $\beta_1$ is a value selected from the values of about unity gain or lower gain, and $\beta_2$ is a value at a lower gain than $\beta_1$ at a threshold probability level of non-ringing, wherein said ringing detector requires substantial dwelling of the computed gain within the ringing range for the first preselected period of time.

4. An amplified system according to claim 1, wherein said ringing detector uses a ringing range that is bounded by a $\beta_1$ and a $\beta_2$, where $\beta_1$ is a value selected from the values of about unity gain or lower gain, and $\beta_2$ is a value at a lower gain than $\beta_1$ that represents a transition between perceptual ringing and room acoustics, wherein said ringing detector requires substantial dwelling of the computed gain within the ringing range for the first preselected period of time.

5. An amplified system according to claim 1, wherein said ringing detector uses a ringing range that is bounded by a $\beta_1$ and a $\beta_2$, where $\beta_1$ is a value selected from the values of about unity gain or lower gain, and $\beta_2$ is a value at a lower gain than $\beta_1$ that represents a transition between ringing and weak-ringing, wherein said ringing detector requires substantial dwelling of the computed gain within the ringing range for the first preselected period of time.

6. An amplified system according to claim 1, further comprising a frequency interpolator functional to refine the measurement of the frequency of feedback.

7. An amplified system according to claim 6, further comprising a narrow-band feedback suppressor having a frequency range of suppression less than the frequency-spectrum division in which the center frequency of said suppressor resides.

8. An amplified system according to claim 6, wherein said frequency interpolator uses a mathematical second-order polynomial interpolation, wherein the interpolation is optionally a curve best fit in the least-squares sense.

9. A ringing detection system for the suppression of ringing artifacts in an amplified system, comprising:

an input port functional to receive an audio signal;

an output port functional to output an audio signal;

a frequency level detector receiving a signal of said input port or said output port, said detector configured to provide a volume level with respect to a plurality of frequency-spectrum divisions;

a gain determiner configured to compute the gain between two measured volumes of sound at frequencies of potential feedback measured at two contemporaneous times; and a ringing detector functional to evaluate the computed gain at a plurality of frequency divisions, wherein each gain evaluation produces a positive indication of ringing in association with a frequency division where the corresponding computed gain about that frequency division remains substantially within a ringing range for a first preselected period of time;

wherein said ringing detector incorporates a measure of probability of present feedback for each of the plurality of frequency-spectrum divisions.

10. A ringing detection system according to claim 9, wherein for each of the plurality of frequency-spectrum divisions said ringing detector repeatedly updates the measure of probability as gain values are produced and further wherein a positive indication of ringing occurs at a time when the measure of probability exceeds a threshold.

11. A ringing detection system according to claim 9, wherein said ringing detector uses a ringing range that is bounded by a $\beta_1$ and a $\beta_2$, where $\beta_1$ is a value selected from the values of about unity gain or lower gain, and $\beta_2$ is a value at a lower gain than $\beta_1$ at a threshold probability level of non-ringing, wherein said ringing detector requires substantial dwelling of the computed gain within the ringing range for the first preselected period of time.

12. A ringing detection system according to claim 9, wherein said ringing detector uses a ringing range that is bounded by a $\beta_1$ and a $\beta_2$, where $\beta_1$ is a value selected from the values of about unity gain or lower gain, and $\beta_2$ is a value at a lower gain than $\beta_1$ that represents a transition between perceptual ringing and room acoustics, wherein said ringing detector requires substantial dwelling of the computed gain within the ringing range for the first preselected period of time.

13. A ringing detection system according to claim 9, wherein said ringing detector uses a ringing range that is bounded by a $\beta_1$ and a $\beta_2$, where $\beta_1$ is a value selected from the values of about unity gain or lower gain, and $\beta_2$ is a value at a lower gain than $\beta_1$ that represents a transition between ringing and weak-ringing, wherein said ringing detector requires substantial dwelling of the computed gain within the ringing range for the first preselected period of time.

14. A ringing detection system according to claim 9, further comprising a frequency interpolator functional to refine the measurement of the frequency of feedback.

15. A ringing detection system according to claim 14, further comprising a narrow-band feedback suppressor having a frequency range of suppression less than the frequency-spectrum division in which the center frequency of said suppressor resides.

16. A ringing detection system according to claim 14, wherein said frequency interpolator uses a mathematical second-order polynomial interpolation, wherein the interpolation is optionally a curve best fit in the least-squares sense.

17. A ringing detection system according to claim 9, further comprising a howling-type feedback detector configured to use the computed gain as an input.

* * * * *